(12) United States Patent
Farris et al.

(10) Patent No.: US 6,574,216 B1
(45) Date of Patent: *Jun. 3, 2003

(54) PACKET DATA NETWORK VOICE CALL QUALITY MONITORING

(75) Inventors: Robert D. Farris, Sterling, VA (US); Eric A. Voit, Baltimore, MD (US)

(73) Assignee: Verizon Services Corp., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/815,361

(22) Filed: Mar. 11, 1997

(51) Int. Cl.[7] ............................................. H04L 12/66
(52) U.S. Cl. ..................... 370/352; 370/237; 370/356; 379/221
(58) Field of Search .................. 370/352, 356, 370/410, 463, 522, 237; 379/207, 230, 283, 220, 22.1

(56) References Cited

U.S. PATENT DOCUMENTS

| | | | |
|---|---|---|---|
| 4,313,036 A | * 1/1982 | Jabara et al. ............... | 370/354 |
| 4,652,700 A | 3/1987 | Matthews et al. | |
| 4,827,500 A | 5/1989 | Binkerd et al. | |
| 4,872,160 A | 10/1989 | Hemmady et al. | |
| 4,958,341 A | 9/1990 | Hemmady et al. | |
| 5,008,926 A | 4/1991 | Misholi | |
| 5,012,511 A | 4/1991 | Hanle et al. | |
| 5,029,199 A | 7/1991 | Jones et al. | |
| 5,193,110 A | 3/1993 | Jones et al. | |
| 5,206,901 A | 4/1993 | Harlow et al. | |
| 5,208,848 A | 5/1993 | Pula | |
| 5,247,571 A | 9/1993 | Kay et al. | |
| 5,309,437 A | 5/1994 | Perlman et al. | |
| 5,341,374 A | 8/1994 | Lewen et al. | |
| 5,375,068 A | 12/1994 | Palmer et al. | |
| 5,406,557 A | 4/1995 | Baudoin | |

(List continued on next page.)

OTHER PUBLICATIONS

Weisser et al., "The Intelligent Network and Forward–Looking Technology" IEEE Communications Magazine, Dec. 1988, pp. 64–69.

Shah et al., "Application of a New Network Concept for Faster Service Deployment ", International Conference on Communications '88, Jun. 12–15, 1988, IEEE Communications Society Conference Record, vol. 3, pp. 1327–1329.

*Primary Examiner*—Wellington Chin
*Assistant Examiner*—Frank Duong
(74) *Attorney, Agent, or Firm*—Leonard Suchyta; Loren Swingle; Rader, Fishman & Grauer PLLC

(57) ABSTRACT

The quality of service existing in a data packet network during the course of communication of a voice call through a data network, such as the Internet, is monitored. A minimum acceptable level of service may be predefined with a threshold quality level stored in the user's Call Processing Record (CPR) in the AIN Integrated Services Control Point (ISCP). If the monitored quality is maintained in excess of the stored threshold, communication of the call continues through the established course of transmission. If the measured quality of service on the data network is not satisfactory, the routing of the call is changed to communication solely through a voice telephone network connection, which may include an Interexchange Carrier link, without terminating the call. The packet data network is thereby bypassed to obtain voice grade quality while maintaining the call.

12 Claims, 6 Drawing Sheets

U.S. PATENT DOCUMENTS

| | | | |
|---|---|---|---|
| 5,410,754 A | | 4/1995 | Klotzbach et al. |
| 5,430,727 A | | 7/1995 | Callon |
| 5,434,913 A | | 7/1995 | Tung et al. |
| 5,490,247 A | | 2/1996 | Tung e tal. |
| 5,493,568 A | | 2/1996 | Sampat et al. |
| 5,524,145 A | * | 6/1996 | Parker .................... 379/197 |
| 5,604,737 A | * | 2/1997 | Iwami et al. ............ 370/352 |
| 5,608,786 A | | 3/1997 | Gordon |
| 5,610,910 A | * | 3/1997 | Focsaneanu et al. ...... 370/351 |
| 5,724,355 A | | 3/1998 | Bruno et al. |
| 5,726,984 A | | 3/1998 | Kubler et al. |
| 5,732,078 A | * | 3/1998 | Arango .................... 370/355 |
| 5,742,596 A | * | 4/1998 | Baratz et al. ............ 370/356 |
| 5,818,836 A | * | 10/1998 | DuVal .................... 370/352 |
| 5,838,665 A | * | 11/1998 | Kahn et al. .............. 370/352 |
| 5,867,495 A | * | 2/1999 | Elliot et al. .............. 370/352 |
| 5,898,668 A | * | 4/1999 | Shaffer .................... 370/230 |
| 5,898,673 A | * | 4/1999 | Riggan et al. ............ 370/237 |
| 5,903,558 A | * | 5/1999 | Jones et al. .............. 370/351 |
| 6,064,653 A | * | 5/2000 | Farris .................... 370/352 |
| 6,137,792 A | * | 10/2000 | Jonas et al. .............. 370/354 |

* cited by examiner

PACKET DATA NETWORK VOICE CALL QUALITY MONITORING

RELATED APPLICATIONS

This application is related to application Ser. No. 08/821,027, filed Mar. 19, 1997 and entitled Voice Call Alternative Routing Through PSTN And Internet Networks, application Ser. No. 08/634,544, entitled Universal Access Multimedia Network, filed Apr. 18, 1996, application Ser. No. 08/634,543, entitled Internet Telephone Service, filed Apr. 18, 1996 and application Ser. No. 08/670,908, entitled Internet Telephone System, filed Jun. 28, 1996. The specifications of those applications are incorporated herein by reference in their entirety.

TECHNICAL FIELD

The present invention relates to telecommunications networks and more particularly to monitoring the quality of performance of voice calls routed through a data packet network. If quality conditions are determined to be unacceptable, call routing is transferred through a voice telephone network without requiring termination of the call.

BACKGROUND OF THE INVENTION

Implementation of voice telephone service over a worldwide data network, such as the Internet, offers advantages that are now being explored. The Internet had its genesis in U.S. Government (called ARPA—Advanced Research Projects Agency) funded research which made possible national internetworked communication systems. This work resulted in the development of network standards as well as a set of conventions and protocols for interconnecting networks and routing information. These protocols, commonly referred to as TCP/IP—Transport Control Protocol/Internet Protocol—have subsequently become widely used in the industry. TCP/IP is flexible and robust. In effect, TCP takes care of the integrity and IP moves the data. Internet provides two broad types of services: connectionless packet delivery service and reliable stream transport service. The Internet basically comprises several large computer networks joined together over high-speed data links ranging from ISDN to T1, T3, FDDI, SONET, SMDS, OT1, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries.

A simplified diagram of the Internet is depicted in FIG. 1. The Internet 50 comprises Autonomous Systems (AS) which may be owned and operated by Internet Service Providers (ISPs) such as PSI, UUNET, MCI, SPRINT, etc. Three such AS/ISPs are shown in FIG. 1 at 52, 54 and 56. The Autonomous Systems (ASs) are linked by Inter-AS Connections 58, 60 and 62. Information Providers (IPs) 64 and 66, such as America Online (AOL) and Compuserve, are connected to the Internet via high speed lines 68 and 70, such as T1/T3 and the like. Information Providers generally do not have their own Internet based Autonomous Systems but have or use Dial-Up Networks such as SprintNet (X.25), DATAPAC and TYMNET.

By way of current illustration, MCI is both an ISP and an IP, Sprint is an ISP, and MicroSoft (MSN) is an IP using UUNET as an ISP. Other information providers, such as universities, are indicated in exemplary fashion at 72 and are connected to the AS/ISPs via the same type connections, here illustrated as T1 lines 74. Corporate Local Area Networks (LANs), such as those illustrated at 76 and 78, are connected through routers 80 and 82 and links shown as T1 lines 84 and 86. Laptop or PC computers 88 and 90 are representative of computers connected to the Internet via the public switched telephone network (PSTN), shown connected to the AS/ISPs via dial up links 92 and 96.

The Information Providers (IPs) are end systems that collect and market the information through their own servers. Access providers are companies such as UUNET, PSI, MCI and SPRINT which transport the information. Such companies market the usage of their networks.

In simplified fashion the Internet may be viewed as a series of gateway routers connected together with computers connected to the routers. In the addressing scheme of the Internet an address comprises four numbers separated by dots. An example would be 164.109.211.237. Each machine on the Internet has a unique number that includes one of these four numbers. In the address, the leftmost number is the highest number. By analogy this would correspond to the ZIP code in a mailing address. The first two numbers that constitute this portion of the address may indicate a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This process continues until the packet arrives at the destination computer. The separate packets that constitute a message may not travel the same path, depending on traffic load. However, they all reach the same destination and are assembled in their original sequence order in a connectionless fashion. This is in contrast to connection oriented modes such as frame relay and ATM or voice.

Software has recently been developed for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers. The book "Mastering the Internet", Glee Cady and Pat McGregor, SYBEX Inc., Alameda, Calif., 1994, ISBN 94-69309, very briefly describes three proprietary programs said to provide real-time video and voice communications via the Internet.

Palmer et al., U.S. Pat. No. 5,375,068, issued Dec. 20, 1994 for Video Teleconferencing for Networked Workstations discloses a video teleconferencing system for networked workstations. A master process executing on a local processor formats and transmits digital packetized voice and video data, over a digital network using TCP/IP protocol, to remote terminals.

Lewen et al., U.S. Pat. No. 5,341,374, issued Aug. 23, 1994 for Communication Network Integrating Voice Data and Video with Distributed Call Processing, discloses a local area network with distributed call processing for voice, data and video. Real-time voice packets are transmitted over the network, for example to and from a PBX or central office.

Hemmady et al., U.S. Pat. No. 4,958,341, issued Sept. 18, 1990 for Integrated Packetized Voice and Data Switching System, discloses an integrated packetized voice and data switching system for a metropolitan area network (MAN). Voice signals are converted into packets and transmitted on the network.

Tung et al., U.S. Pat. No. 5,434,913, issued Jul. 18, 1995, and U.S. Pat. No. 5,490,247, issued Feb. 6, 1996, for Video Subsystem for Computer Based Conferencing System, disclose an audio subsystem for computer-based conferencing. The system involves local audio compression and transmission of information over an ISDN network.

Hemmady et al., U.S. Pat. No. 4,872,160, issued Oct. 3, 1989, for Integrated Packetized Voice and Data Switching System, discloses an integrated packetized voice and data switching system for metropolitan area networks.

Sampat et al., U.S. Pat. No. 5,493,568, issued Feb. 20, 1996, for Media Dependent Module Interface for Computer Based Conferencing System, discloses a media dependent module interface for computer based conferencing system. An interface connects the upper-level data link manager with the communications driver.

Koltzbach et al., U.S. Pat. No. 5,410,754, issued Apr. 25, 1995, for Bi-Directional Wire Line to Local Area Network Interface and Method, discloses a bi-directional wire-line to local area network interface. The system incorporates means for packet switching and for using the internet protocol (IP).

The commonly assigned applications, Ser. Nos. 08/634, 543 and 08/670,908, identified more particularly above, are concerned with providing telephone service via the Internet to users of the public telecommunications network who may not have access to a computer or separate telephone access to the Internet. Such service would be economical, especially for long distance calls, compared with the toll rates charged by long distance interexchange carriers.

With increasing volume of use on the Internet and the bursty nature of data transmission, traffic patterns have become unstable and unpredictable. The minimum quality of service acceptable for voice communication is much higher than the level for data transport as transmission delays noticeably degrade conversation. With the Internet or other high volume data network, acceptable voice communication may be available between two end points at a given time, but often not at other times. A surge in data traffic may make the network unsuitable for voice communication for as much as twenty or thirty minutes. Bottlenecks may occur at different points in the network at different times. The locations of the participants of a voice call are factors in determining suitability of the data network. The degree to which degradation of a voice call remains acceptable is subjective with the user and can be a tradeoff between quality of service and reduction of cost.

A deficiency in earlier proposed voice Internet service systems is the inability to ensure an acceptable level of service quality. Voice communication by nature should be perceived as real time interaction in order to be acceptable to the parties of the call. The packet data network traffic in the connection paths of a voice call may render intolerable transmission delays. Current systems do not measure delays against user acceptable standards. A high level of congestion and delay in a data network often leads to lost or dropped data packets that would noticeably degrade reconstructed voice audio. The voice call user must either endure such deficiencies or terminate the call in favor of originating a new call through an alternative system.

The aforementioned commonly assigned application Ser. No. 08/821,027, filed Mar. 19, 1997 and entitled Voice Call Alternative Routing Through PSTN And Internet Networks, is concerned with determining routing of voice calls alternatively between the public switched telephone network (PSTN) and a data packet network, such as the Internet, in accordance with the quality of service existing in the data packet network at the times of call origination. Through use of the PSTN Advanced Intelligent Network (AIN), a caller may predefine an acceptable level of service, for example 2.4 or 4.8 kbs to be stored in the user's Call Processing Record (CPR) in the AIN Integrated Services Control Point (ISCP). On a per call basis, the caller linked to a first public switched network may indicate a preference to route through the Internet. This indication would be recognized by the AIN system, in response to which the quality of service currently present on the Internet for completion of the call is measured. If the result exceeds the stored threshold, the call is set up and routed through the Internet to the switched network link to the destination party. If the quality of service on the Internet is not satisfactory, the call would be alternatively routed through the PSTN, which may include an Interexchange Carrier link.

The last described arrangement is an improvement over prior voice data network schemes in the respect that determination of data network performance quality avoids set up of a call that would be known at the outset to be inadequate for voice communication. However, with relatively unstable and unpredictable traffic patterns in data networks such as the Internet, the alternative set up arrangement does not accommodate a change to poor data network performance conditions after a call has been placed and routed through the data network. Thus, parties to such a call still must either suffer the deficiencies in voice quality, perhaps in the hope that data traffic conditions improve, or terminate the call in favor of a new call manually placed through the switched telephone network.

BRIEF SUMMARY OF THE INVENTION

The present invention overcomes the above noted drawbacks of earlier proposed systems and provides additional advantages in part by monitoring the quality of service existing in a data packet network during the course of communication of a voice call through the data network. The user's acceptable level of service may be predefined with a threshold quality level stored in the user's Call Processing Record (CPR) in the AIN Integrated Services Control Point (ISCP). If the monitored quality is maintained in excess of the stored threshold, communication of the call continues through the established course of transmission. If the measured quality of service on the data network is not satisfactory, the routing of the call is changed to communication solely through a voice telephone network connection, which may include an Interexchange Carrier link, without terminating the call. Thus, the packet data network is bypassed to obtain voice grade quality while maintaining the call.

Monitoring of the data network, which may be the Internet, may be under control of a module that interfaces between the data network and the public switched telephone network. The caller's predefined acceptable level of quality, stored in the AIN ISCP may be obtained by the module for comparison with monitored levels. Upon failure of the comparison, the module can issue a signal to the calling station switch to automatically establish a connection for the call from the calling station switch through the PSTN to a second switch coupled to the called station. Such signal also can be generated by the module in response to a DTMF input by either user. Such input reflects the user's perceived dissatisfaction with quality of the call and acts as a command to automatically reroute the call to bypass the data network. Upon connection of the two switches through the voice telephone network, the voice call is bridged at each of the switches to the established connection. Communication of the call through the packet data network path is thereafter terminated.

Additional advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings, throughout the various figures of which like elements are depicted by the same reference numerals, and description are to be regarded as illustrative in nature, and not as restrictive.

DETAILED DESCRIPTION OF THE INVENTION

Figure 2:
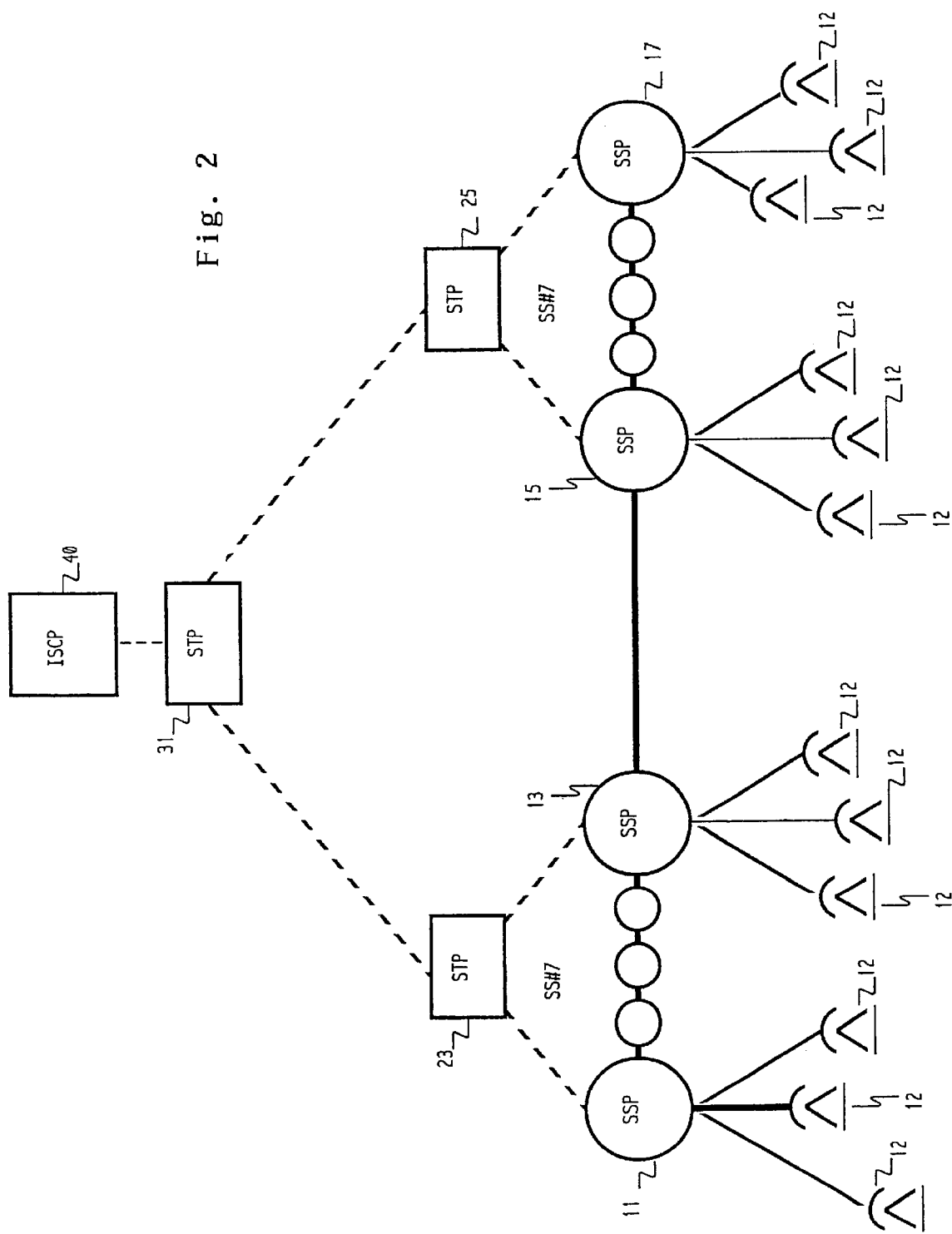
FIG. 2 is a simplified block diagram of a Public Switched Telephone Network (PSTN) that comprises a Common Channel Interoffice Signaling (CCIS) system and voice communication network that perform as an Advanced Intelligent Network (AIN) system.

FIG. 2 is a depiction of the AIN architectural environment that is considerably simplified for explanation purposes. The full network and operating environment for the invention may comprise multiple central offices, diverse interconnections, and provisions for reliability through redundancy, all of which need not be shown for developing an understanding of the invention. Service Switching Points (SSPs) 11, 13, 15, 17 represent central office (CO) switching systems that are appropriately equipped programmable switches present in the telephone network. Subscriber lines individually connect SSPs to subscriber premises at which locations telephones 12 or other communication devices are connected. As well known, the SSPs recognize AIN type calls, launch queries to the ISCP and receive commands and data from the ISCP to further process the AIN calls. In the illustrated embodiment, the CO-SSPs are end offices.

SSP capable central office switching systems typically contain a programmable digital switch with CCIS communications capabilities. One example of an SSP capable CO switch is a 5ESS type switch manufactured by AT&T. Other vendors, such as Northern Telecom and Seimens, manufacture comparable digital switches that may serve as the SSPs. A more detailed description of an exemplary SSP type CO is presented in the commonly assigned copending application, Ser. No. 08/248,980, filed May 25, 1994, hereby incorporated by reference herein.

The SSP type COs 11 and 13 are shown connected to a first local area STP 23, SSP-COs 15 and 17 being connected to a second local area STP 25. The connections to the STPs are for signalling purposes. The control part of SS7 protocol is known as Integrated Services Digital Network User Part (ISUP). ISUP determines the procedures for setting up, coordinating, and taking down trunk calls on the SS7 network.

Signaling between switching offices is required for transmitting routing and destination information, for transmitting alerting messages such as to indicate the arrival of an incoming call, and for transmitting supervisor information, e.g. relating to line status. Signaling between offices can use 'in-band' transport or 'out-of-band' transport.

In-band signaling utilizes the same channel that carries the communications of the parties. In a voice telephone system, for example, one of the common forms of in-band signaling between offices utilizes multi-frequency signaling over voice trunk circuits. The same voice trunk circuits also carry the actual voice traffic between switching offices. In-band signaling, however, tends to be relatively slow and ties up full voice channels during the signaling operations. In telephone call processing, a substantial percentage of all calls go unanswered because the destination station is busy. For in-band signaling, the trunk to the end office switching system serving the destination is set-up and maintained for the duration of signaling until that office informs the originating office of the busy line condition. Thus, in-band signaling greatly increases congestion on the voice traffic channels. In-band signaling also is highly susceptible to fraud by hackers who have developed devices that mimic in-band signaling.

Out-of-band signaling has evolved to mitigate the above-described problems. Out-of-band signaling utilizes separate channels, and in many cases separate switching elements. Congestion on the channels carrying the actual communication traffic is thereby considerably reduced. Unauthorized simulation of signaling messages which ride on an out-of-band channel or network is virtually impossible. As out-of-band signaling utilizes its own signal formats and protocols, unconstrained by protocols and formats used for the actual communication, out-of-band signaling typically is considerably faster than in-band signaling.

Out of-band-signaling networks typically include data links and one or more packet switching systems. Out-of-band signaling for telephone networks is often referred to as Common Channel Signaling (CCS) or Common Channel Interoffice Signaling (CCIS). Most such signaling communications for telephone networks utilize signaling system 7 (SS7) protocol. An SS7 compliant CCIS network, such as illustrated in FIG. 2, comprises data Signal Transfer Points (STPs) and data links between the STPs and various telephone switching offices of the network. The STPs are program controlled packet data switching systems. In normal call processing operation, an STP will receive a packet data message from another node of the network, for example from an end office switching system. The STP analyzes point code information in the packet and routes the packet according to a translation table stored within the STP. This translation table is static. Any packet having a particular point code is output on a port going to the next CCIS signaling node specified by translation of that point code.

Each local area STP can connect to a large number of the SSP-COs, as indicated for ease of illustration merely by the circles below STPs 23 and 25. The central office SSPs are interconnected to each other by trunk circuits for carrying telephone services. The overall network may contain end offices without SSP functionality. Such end offices will forward calls to one of the SSPs if such treatment is required. Also, certain switching offices within the network, whether SSPs or not, may function primarily as tandem type offices providing connections between trunk circuits only.

The local area STPs 23 and 25, and any number of other such local area STPs (not shown) communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches. Also, certain switching offices within the network, whether SSPs or not, may function primarily as tandem type offices providing connections between trunk circuits only.

The links between the central office switching systems and the local area STPs 23 and 25 are typically SS#7 type CCIS interoffice data communication channels. The local area STPs are in turn connected to each other and to the regional STP 31 via a packet switched network. The regional STP 31 also communicates with the ISCP 40 via a packet switched network.

Messages transmitted between the SSPs and the ISCP are formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits and a "SEND TO RESOURCES" message to instruct the SSP to route to another network node. Reference is made to the aforementioned copending application, Ser. No. 08/248,980, filed May 25, 1994, for a more detailed description of the AIN network.

The ISCP 40 is an integrated system that contains a database. In the AIN network system, certain calls receive specialized AIN type processing under control of data files stored in the ISCP data base. Such files contain call processing records (CPRS) associated with respective AIN subscribers. Information contained in the CPRs relate to the AIN service or services to which the customer subscribes.

The SSP type local offices of the public telephone network include appropriate data in their translation tables for customers subscribing to AIN services to define certain call processing events identified as AIN "triggers". The SSP uses the translation table data to detect a triggering event during processing of calls to or from such AIN service subscribers. Upon detection of such event, the SSP suspends processing of a call and activates a query and response type AIN interaction with the ISCP. Completion of call processing ensues after sufficient information is exchanged between the SSP and the ISCP. For ordinary telephone service calls that are not subject to enhanced treatment, there would be no event to trigger AIN messaging. The local and toll office switches would function normally and process such calls without referring to the ISCP data base for instructions.

Figure 3:
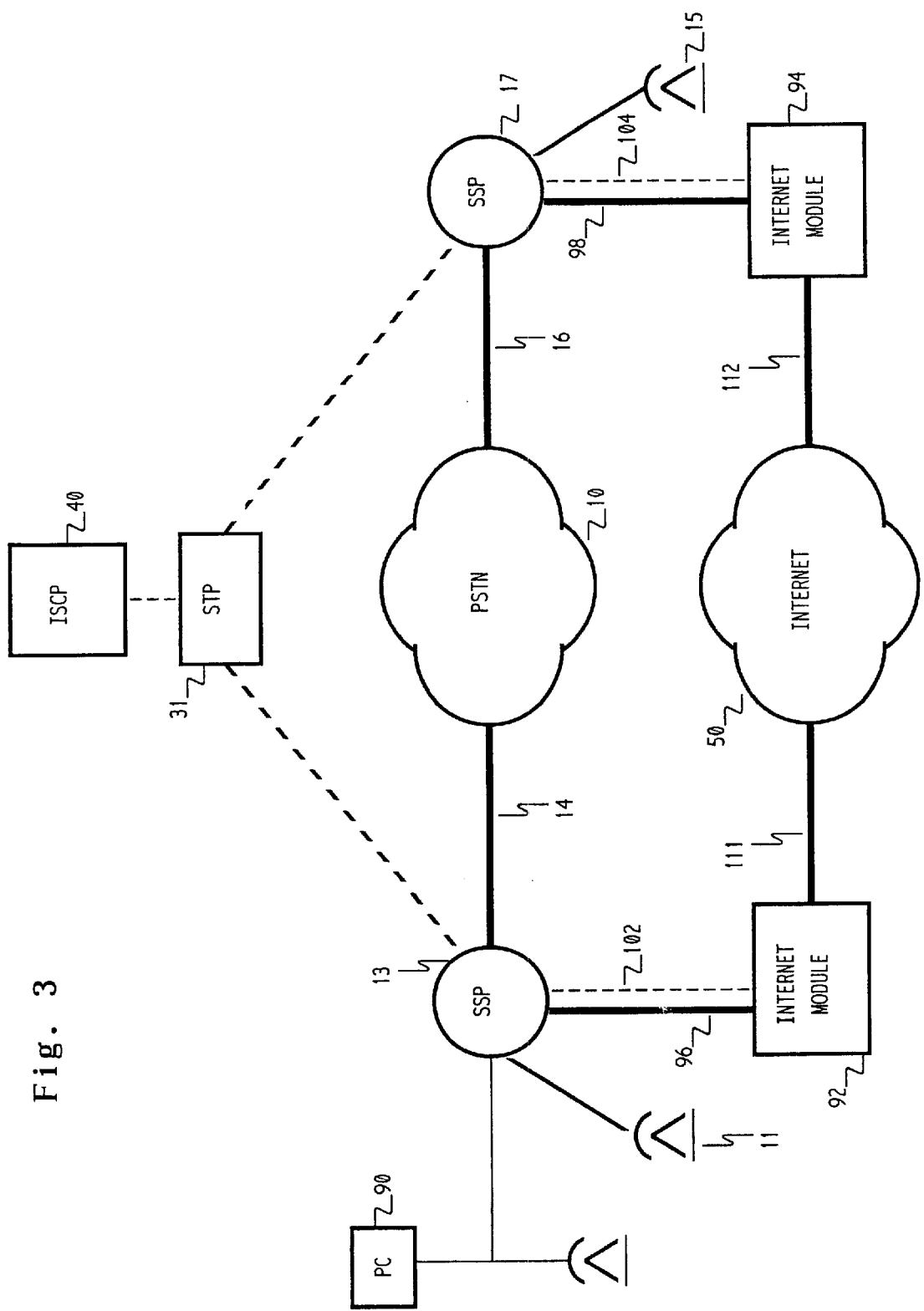
FIG. 3 is a simplified block diagram of an AIN controlled PSTN, such as the type shown in FIG. 2, which includes architecture for implementing Internet routing in accordance with one preferred embodiment of the invention.

FIG. 3 is a simplified block diagram of an AIN controlled PSTN, such as the type shown in FIG. 2, which includes architecture for implementing Internet routing in accordance with one preferred embodiment of the invention. It is to be understood that the Internet representation in this figure, as well as throughout this disclosure, is illustrative of any packet network of routers that allows voice traffic to be packetized and sent over a shared network. The use of the phrases "Internet" and "data packet network" or the like are used interchangeably throughout this description. SSP capable central offices 13 and 17, which may be located in the same or different states and regions, are connected by trunks 14 and 16 respectively to the PSTN indicated by a cloud 10. Each central office is connected by local loops to subscribers customer premises equipment (CPE) such as telephone terminals 12 and PC 90. The telephone 12 may be a standard telephone used for Plain Old Telephone Service (POTS), with conversion of analog voice to digital signals performed at a central office, or a so-called "Internet Phone" that outputs digital voice signals. The SSPs 13 and 17 are connected by CCIS links to STP 31 which in turn may be connected to ISCP 40. While the STP functionality is here shown as constituting a single STP it will be appreciated that this is for the purpose of simplicity only and that a hierarchy of STPs may be involved.

Each of the central office SSPs 13 and 17 is connected to Internet Module 92 and 94, respectively, by T1 trunks 96 and 98. Alternatively, the Internet Module hardware may be situated at the central office and associated with the switching system. The Internet Module will be described in further detail with respect to FIG. 4. The Internet Modules may be provided with SSP capabilities and connected into the CCIS network directly to an STP or, as illustrated by the links 102 and 104, to the SSPs 13 and 17. The Internet Modules may be linked together for signaling purposes by conventional F links. The Internet Modules are connected to the Internet cloud by T1/T3 trunks 111 and 112.

Figure 1:
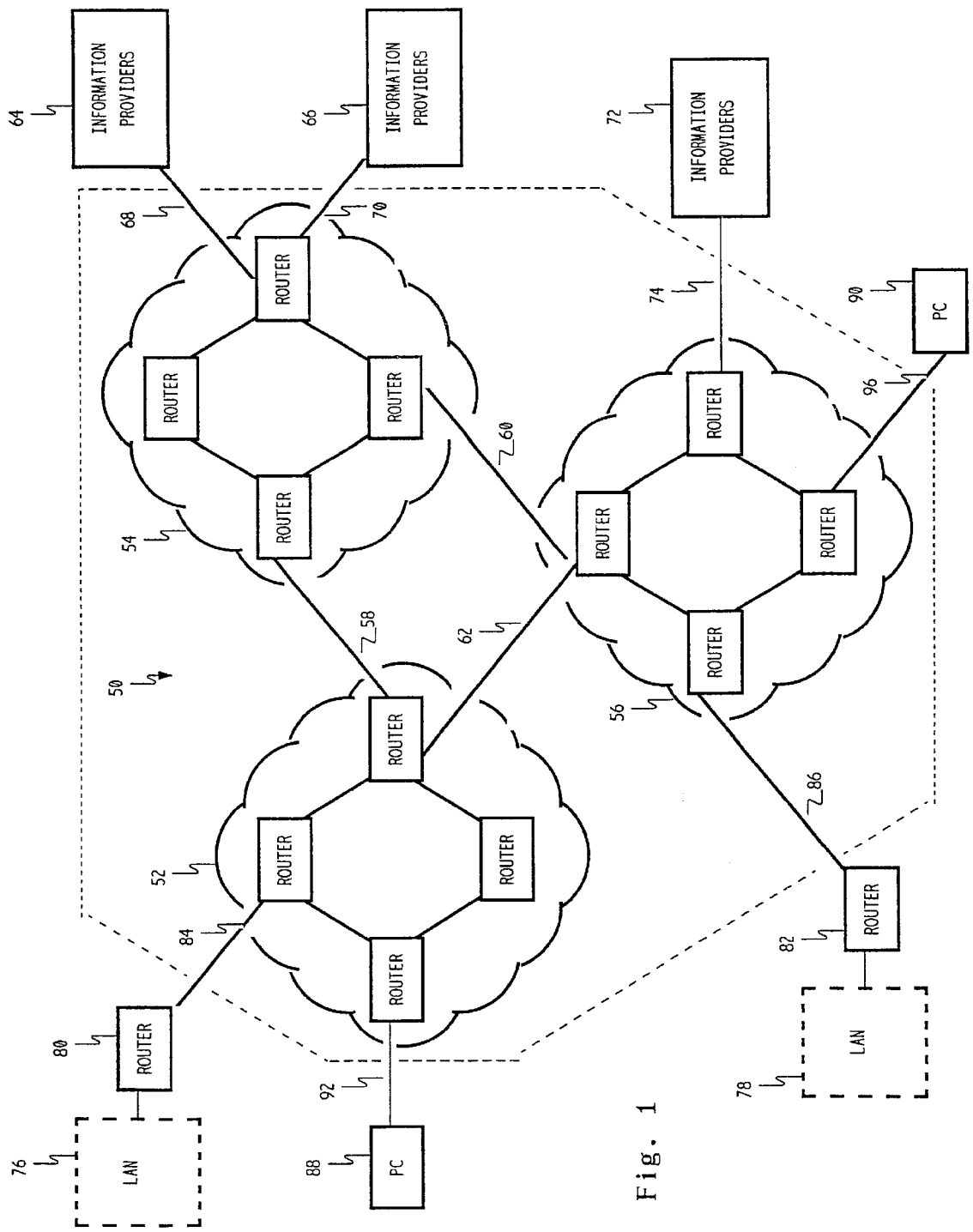
FIG. 1 is a simplified diagram of the Internet.
Figure 4:
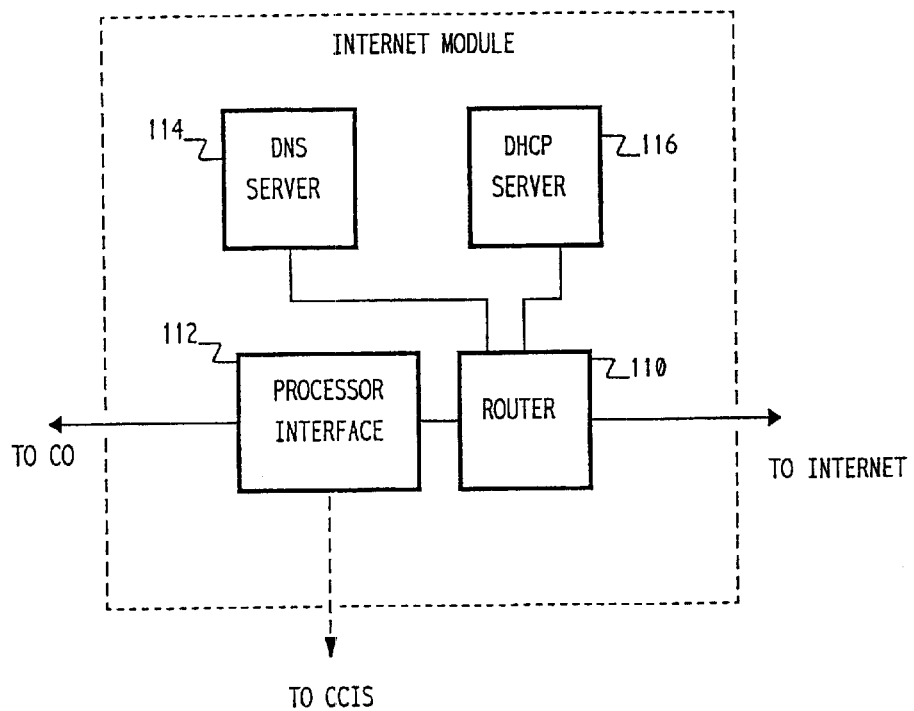
FIG. 4 is a diagram of the functional architecture of one embodiment of an Internet Module for use in the system and method of the invention.

The functional architecture of one embodiment of an Internet Module for use in the invention is shown diagrammatically in FIG. 4. The Internet Module includes a gateway router 110 of the type now generally used in Internet practice, such as shown in FIG. 1 and described in related application Ser. No. 08/634,544, referenced above. An interface with processing capability is illustratively shown at 112. Connected to the router are a Domain Name Service (DNS) server 114 and a Dynamic Host Configuration Protocol (DHCP) server 116 of the type conventionally used by Internet Service Providers in existing Internet Service. The router interface is connected to the central office and to the CCIS network while the router is connected to the Internet.

Figure 5:
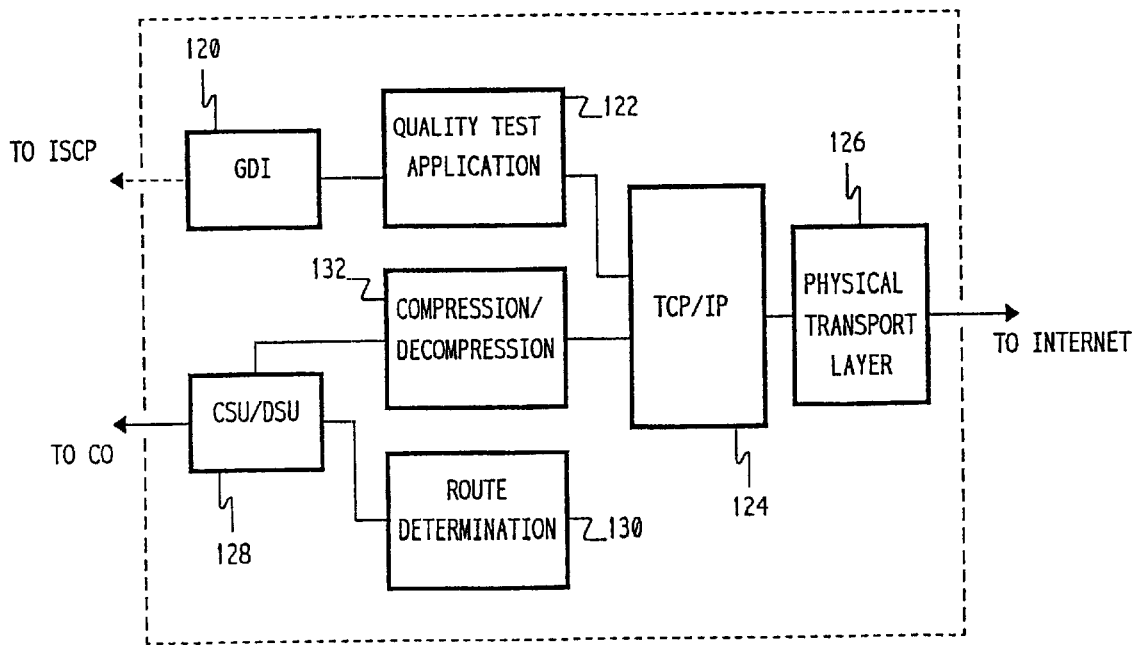
FIG. 5 is a block diagram that represents the functionality of the processor interface 112 and the router 110 shown in FIG. 4.

FIG. 5 is a block diagram that represents the functionality of the processor interface 112 and the router 110. The processor contains a common Generic Data Interface (GDI) 120 for communicating signaling messages with the ISCP over the common channel signaling network. Data communication by the gateway router of both signaling and information content through the Internet (or other equivalent packet network) occurs through TCP/IP protocol 124, packets being transmitted and received through physical transport layer 126. The physical transport layer may comprise Asynchronous Transfer Mode (ATM), frame relay or some other type of data communication mode.

While message and signaling communication with the common channel signaling network occurs through the GDI, communication of voice data is made through the Channel Serving Unit, Digital Serving Unit (CSU/DSU) 128. This unit, which may physically comprise a digital line card in the processor with standard 24 digital voice line inputs, packetizes voice data received from the telephone central office. The CSU/DSU coordinates with route determination unit 130 to identify packets, termination phone numbers and routes to the network termination gateway router. The route determination information is included in each packet for the data received from the originating central office SSP. The packetized data is compressed in accordance with stored algorithm 132, before being sent to the TCP/IP stack and physical transport layer for transmission to the far end gateway router. To complete transmission to the destination telephone, the termination router decompresses the received packets, depacketizes back to voice data which is then routed to the destination PSTN. Two way capability for each of the functions is provided for communication in both directions. While shown for illustrative purposes as separate blocks, the route determination and compression/decompression functions, as well as the quality test application, may be run, for example, by a UNIX-based computer.

Figure 6A:
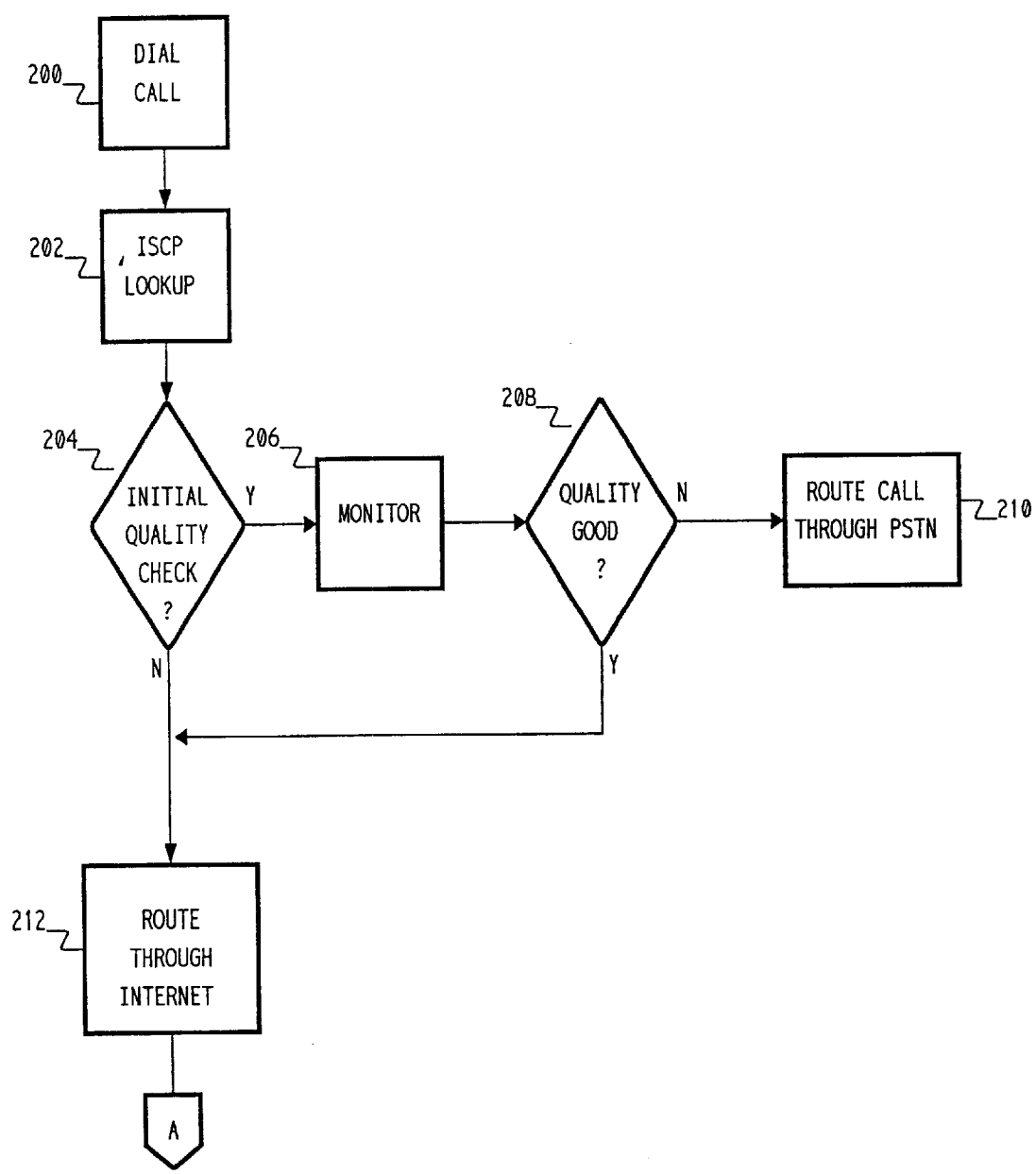
FIGS. 6A and 6B taken together form a simplified flow chart that illustrates operation of preferred embodiments of the invention.
Figure 6B:
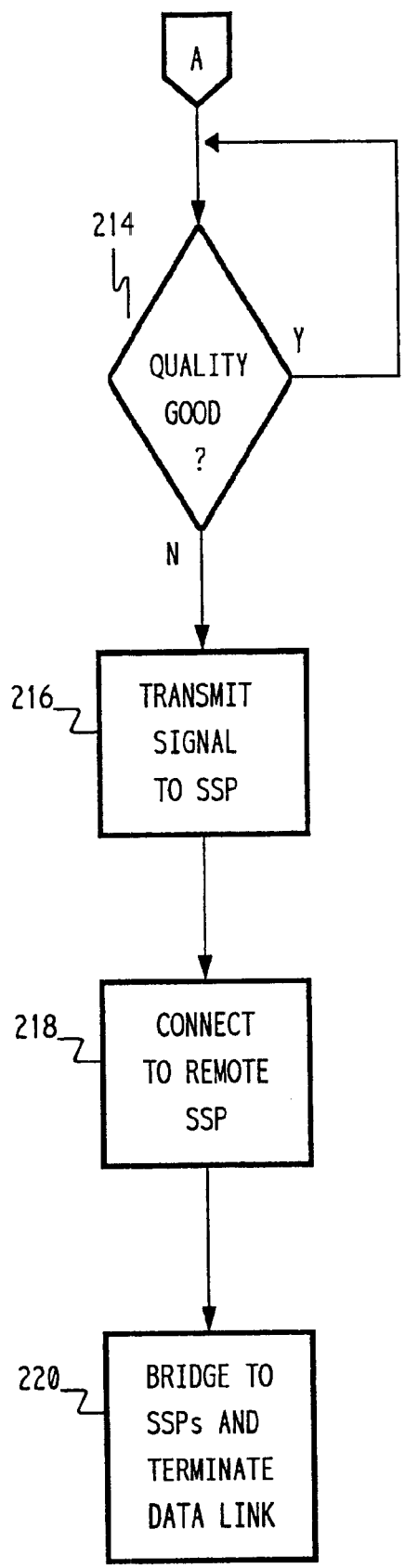

FIGS. 6A and 6B taken together form a simplified flow chart that illustrates operation of preferred embodiments of the invention. At step 200, a voice call is placed, for example, by calling telephone station 11, connected to central office SSP switch 13, to telephone station 15, connected to central office SSP switch 17. The dialing information indicates that the call is to be routed through the Internet. The specific manner in which dialed input is used to designate such routing may be in any of several alternatives, as more fully described in the aforementioned applications, Ser. Nos. 08/634,543 and 08/670,908. For example, a data network routing designation for a call may be made on a per call basis, by using a unique entry code, such as *82, or the caller may dial a virtual number, thereafter entering the destination telephone number. Alternatively, the caller's CPR may store criteria for routing all calls dialed to specifically identified destination numbers or area codes through a data network such as Internet. Preselected conditions can include any combination of time of day, day of week, destination areas, or specific destination telephone numbers. Of course, the CPR may be set to attempt Internet routing for all interlata calls if so desired. Calls that are not designated Internet type calls are processed in routine fashion through the PSTN network.

At step 202, call processing for an Internet type call is temporarily suspended by SSP 13, which then transmits a TCAP query message to the ISCP through the STP 31. The ISCP will access the caller's CPR for information as to how to handle the call, including information as to alternate network routing and predefined acceptable data network performance level.

Before continuing routing of the call from the SSP 13, it is determined at step 204 whether the current performance quality through the Internet network is to be compared with the prestored threshold level of acceptability. Checking of these conditions for the purpose of initially routing the call between central office SSPs 13 and 17 alternatively through the Internet or the PSTN network is the subject of disclosure of the aforementioned application Ser. No. 08/821,027, filed Mar. 19, 1997 and entitled Voice Call Alternative Routing Through PSTN And Internet Networks, incorporated herein by reference. As more fully described therein, if an initial quality check is to be performed, the Internet module 92 will receive a prompt message from the ISCP, through the GDI, with the appropriate information. A quality test application in the processor is then initiated for determining whether a call is to be routed through the Internet, at step 206. Performance level monitoring may be performed in a variety of ways. For example, a service test may comprise the sending of a rudimentary signal, known in the art as a "ping" signal, from the local router to the destination router and measuring the response time. The test signal generated by the quality test application is formatted for transport through physical layer 126 and the Internet to the destination end gateway router. If the monitored performance level is found to be unsatisfactory in step 208, the Internet module will issue a signal to the SSP 13 to route the call in routine fashion through the PSTN at step 210.

If it is determined at step 204 that no initial quality check is to be made, or if successful performance quality has been determined at step 208, then routing of the call through the Internet is set up at step 212. The call processing set up continues at SSP 13, which may first determine, either through the SS7 network or through the Internet, whether the call destination station is busy. If the destination station is available, router 110 in Internet module 92 will transmit a message to the destination router in Internet module 94 to initiate a call through SSP 17 in the destination PSTN to the destination station. The path for transmission of the voice data through the data network will have been determined by the CSU/DSU unit 128, in conjunction with route destination unit 130. The call is connected to appropriate CSU/DSU ports in the routers of each of the Internet modules. Quality level criteria, obtained by access of the caller's CPR in the ISCP, will have been downloaded to the GDI at Internet module 92 for use with the quality test application functionality.

While the call is in progress performance quality of the data network is continually monitored under control of the quality test application in Internet module 92. Monitoring of data network performance may be undertaken in step 214 in several alternative ways. During silent intervals in transmission of a call, ping request packets may be transmitted from Internet module 92 and the round trip time duration for receiving response packets measured. The number of voice data packet pulses received per unit time period from the Internet by module 92 is a measure of data flow rate. The time variance between voice data packets received from the Internet at the module 92 is a further indication of performance. The sequence of voice data packets received at module 92 can be checked, the frequency of missed or dropped packets determined. All of these monitored variables can be correlated to a corresponding data rate that can be compared with the predefined acceptable rate for the call received by the module 92 from the ISCP CPR of the calling subscriber. All of these measurements are within the inherent capability of a gateway router, many of which are performed during normal data transmission for other purposes. The quality test application thus can apply a plurality of repetitive test criteria to determine acceptable quality during the course of the call.

As long as the data network performance quality remains acceptable, as monitored repetitively at step 214, transmission will continue through the Internet. If the performance level is found to be unsatisfactory at step 214, the module 92 transmits a control signal to SSP 13 at step 216. At step 218 a connection for the call is established through the PSTN network between SSP 13 and SSP 17. The physical connection to the SSPs may be 3-way or so-called "no-trunk" paths, that are commonly used for conference calls or testing. Set up of this connection preferably is made through the SS7 network if such functionality is available. Alternatively, in-band signaling, either through PSTN or through the Internet from SSP 13 to SSP 17 may take place. Effectively, the call is regenerated between the SSPs 13 and 17, while transmission concurrently takes place through the established Internet route.

At step 220, the lines from stations 11 and 15 are bridged to the respective SSPs 13 and 17 in a seamless manner, without application of audible ringing or ringback signals. Transmission through the Internet is then terminated and communication of the call continues through the established PSTN connection.

As a result of the operation of this invention, quality of communication can be assured during the course of a phone call, while the need to terminate an existing call and thereafter redial a new call through an alternative route with the accompanying annoyance, are avoided. It can be appreciated that this invention will ensure quality of voice communication while taking advantage of available network economies. Only the preferred embodiments of the invention and but a few examples of its versatility are shown and described in the present disclosure. It is to be understood that the invention is capable of use in various other combinations and environments and is capable of changes or modifications within the scope of the inventive concept as expressed herein. For example, while rerouting of a call has been disclosed to be a dynamic process automatically responsive to monitored conditions, the AIN network of the invention can be implemented to be responsive to user input, for example DTMF, during the call. A caller at telephone 11, if desirous of improving the perceived communication quality, can depress the "*" or the like to effect rerouting through the PSTN network. The DTMF input would be recognized by the module 92, which would then generate a signal to the SSP 13 in the same manner as if quality were to be found deficient in step 214. Module 92 can also be made responsive to such DTMF input from station 15, thereby permitting either party to upgrade the call quality. As a further modification, several data rates may be stored in a subscriber's CPR, for example 2.4 kps., 4.8 kps., and 9.6 kps., with one of the rates as a default. Various DTMF signals can be allocated respectively to each of the stored rates. Input of one of the DTMF choices during a call can effect a change in the level with which the performance monitored level is compared. Internet module 92 may obtain the necessary correlating information between DTMF signal and performance level for the quality test application from the ISCP either during the initial access in step 202, or can access the ISCP in response to recognition of receipt of the DTMF input.

We claim:

1. A method of controlling voice communication between calling and called telephone stations each connected through a respective switch to a public switched telephone network (PSTN) region and remotely located from each other, comprising the steps of:

routing a voice call carrying two-way voice communication between said calling and called stations in digital packet format through a path of the Internet;

changing the routing of said call between said calling and called stations from the Internet path to a non-packet data format voice telephone network voice path without terminating the call, thereby bypassing said packet data network while maintaining the voice communication call; and wherein said changing step comprises:

monitoring said packet data network during the course of transmission of said voice call through said packet data network path to determine a quality of performance level;

comparing the performance level determined in said monitoring step with a predetermined threshold level;

rerouting the call to said voice telephone network voice path if the performance level of said packet data network as monitored in said monitoring step is below said predetermined threshold: and wherein the Internet interfaces with a plurality of PSTN regions through respective Internet modules, and said rerouting step comprises:

transmitting a signal from an Internet module connected with the PSTN region of the calling station to the calling station switch;

in response to said signal, establishing a connection for said call from said calling station switch through the PSTN to a second switch coupled to the called station;

bridging the voice call at each of said switches to the established connection; and terminating communication of said call through said packet data network path.

2. A method as recited in claim 1, wherein said predetermined threshold is a minimum acceptable data flow rate and said monitoring step comprises:

measuring the voice data packet pulses received per unit time period from the Internet at the Internet module connected to the PSTN region of the calling station.

3. A method as recited in claim 1, wherein said monitoring step comprises:

measuring the time variance between voice data packets received from the Internet at the Internet module connected to the PSTN region of the calling station; and wherein said performance level is below said predetermined threshold if said measured time variance exceeds a maximum value.

4. A method as recited in claim 1, wherein said monitoring step comprises:

checking the sequence of voice data packets of the call received at the Internet module connected to the PSTN region of the calling station;

detecting whether voice data packets for the call have not been received in said checking step; and said comparing step comprises determining whether the frequency of missed packets detected in said detecting step exceeds a maximum value.

5. A method as recited in claim 1, wherein said establishing step comprises:

transmitting a control signal from the PSTN region of said calling station to the PSTN region of said called station through a common channel signaling system path.

6. A method of controlling voice communication between calling and called telephone stations each connected through a respective switch to a public switched telephone network (PSTN) region and remotely located from each other, comprising the steps of:

routing a voice call carrying two-way voice communication between said calling and called stations in digital packet format through a path of the Internet;

changing the routing of said call between said calling and called stations from the Internet path to a non-packet data format voice telephone network voice path without terminating the call, thereby bypassing said packet data network while maintaining the voice communication call; and wherein said changing step comprises:
  monitoring said packet data network during the course of transmission of said voice call through said packet data network path to determine a quality of performance level;
  comparing the performance level determined in said monitoring step with a predetermined threshold level;
  rerouting the call to said voice telephone network voice path if the performance level of said packet data network as monitored in said monitoring step is below said predetermined threshold: and wherein said performance level is related to data flow rate and said predetermined threshold is a minimum acceptable voice transmission time, said monitoring step comprising:
    transmitting at least one request packet through the Internet;
    receiving at least one response packet; and
    measuring the round trip time duration therebetween.

7. A method of controlling voice communication between calling and called telephone stations each connected through a respective switch to a public switched telephone network (PSTN) region and remotely located from each other, comprising the steps of:
  routing a voice call carrying two-way voice communication between said calling and called stations in digital packet format through a path of the Internet;
  changing the routing of said call between said calling and called stations from the Internet path to a non-packet data format voice telephone network voice path without terminating the call, thereby bypassing said packet data network while maintaining the voice communication call; and wherein said changing step comprises:
    monitoring said packet data network during the course of transmission of said voice call through said packet data network path to determine a quality of performance level;
    comparing the performance level determined in said monitoring step with a predetermined threshold level;
    rerouting the call to said voice telephone network voice path if the performance level of said packet data network as monitored in said monitoring step is below said predetermined threshold: and wherein the Internet interfaces with a plurality of PSTN regions through respective modules, and said rerouting step comprises:
      transmitting a first signal from a module connected with the PSTN region of the called station to the called station switch;
      transmitting a second signal from a module connected with the PSTN region of the called station to the called station switch;
      in response to said first and second signals, establishing a connection for said call from said calling station switch through the PSTN to a second switch coupled to the called station;
      bridging the voice call at each of said switches to the established connection; and
      terminating communication of said call through said public packet data network path.

8. A method as recited in claim 7, wherein said establishing step comprises:
  transmitting an in-band control signal from the PSTN region of said calling station to the PSTN region of said called station through a voice communication trunk.

9. A communications system comprising:
  a public switched telecommunications network (PSTN) having a plurality of interconnected central office switching systems each connected to at least one subscriber line;
  a public data network separate from said switched telecommunications network comprising multiple remotely spaced routers for linking together paths of said public data network using transmission control protocols to provide connectionless packet service between remote locations of said public data network;
  at least two of said central office switching systems connected to a respective interface to said public data network, said central office switching systems providing selective connection between said interfaces and the subscriber lines connected to each of said central office switching systems; and
  means for automatically rerouting a voice call carrying voice communication between subscriber lines of said two central office switching systems that traverse said public data network to a voice path in said PSN in response to a predetermined condition, without terminating the existing voice call; wherein said predetermined condition is the occurrence of an unacceptable level of quality of performance of said public data network, and each said interface comprises means for monitoring said data network during the course of transmission of said voice call through said public data network; and
  wherein said monitoring means measures voice data packet pulses received per unit time period from the public data network.

10. A communications system comprising:
  a public switched telecommunications network (PSTN) having a plurality of interconnected central office switching systems each connected to at least one subscriber line;
  a public data network separate from said switched telecommunications network comprising multiple remotely spaced routers for linking together paths of said public data network using transmission control protocols to provide connectionless packet service between remote locations of said public data network;
  at least two of said central office switching systems connected to a respective interface to said public data network, said central office switching systems providing selective connection between said interfaces and the subscriber lines connected to each of said central office switching systems; and
  means for automatically rerouting a voice call carrying voice communication between subscriber lines of said two central office switching systems that traverse said public data network to a voice path in said PSN in response to a predetermined condition, without terminating the existing voice call;
  wherein said predetermined condition is the occurrence of an unacceptable level of quality of performance of said public data network, and each said interface comprises means for monitoring said data network during the course of transmission of said voice call through said public data network; and wherein said monitoring means transmits a request packet through said public data network, receives a response packet, and measures the round trip time duration therebetween.

11. A communications system comprising:
a public switched telecommunications network (PSTN) having a plurality of interconnected central office switching systems each connected to at least one subscriber line;
a public data network separate from said switched telecommunications network comprising multiple remotely spaced routers for linking together paths of said public data network using transmission control protocols to provide connectionless packet service between remote locations of said public data network;
at least two of said central office switching systems connected to a respective interface to said public data network, said central office switching systems providing selective connection between said interfaces and the subscriber lines connected to each of said central office switching systems; and
means for automatically rerouting a voice call carrying voice communication between subscriber lines of said two central office switching systems that traverse said public data network to a voice path in said PSN in response to a predetermined condition, without terminating the existing voice call;
wherein said predetermined condition is the occurrence of an unacceptable level of quality of performance of said public data network, and each said interface comprises means for monitoring said data network during the course of transmission of said voice call through said public data network; and
wherein said monitoring means measures time variance between voice data packets received from the public data network.

12. A communications system comprising:
a public switched telecommunications network (PSTN) having a plurality of interconnected central office switching systems each connected to at least one subscriber line;
a public data network separate from said switched telecommunications network comprising multiple remotely spaced routers for linking together paths of said public data network using transmission control protocols to provide connectionless packet service between remote locations of said public data network;
at least two of said central office switching systems connected to a respective interface to said public data network, said central office switching systems providing selective connection between said interfaces and the subscriber lines connected to each of said central office switching systems; and
means for automatically rerouting a voice call carrying voice communication between subscriber lines of said two central office switching systems that traverse said public data network to a voice path in said PSN in response to a predetermined condition, without terminating the existing voice call;
wherein said predetermined condition is the occurrence of an unacceptable level of quality of performance of said public data network, and each said interface comprises means for monitoring said data network during the course of transmission of said voice call through said public data network; and
wherein said monitoring means detects lost voice data packets.

* * * * *